US007950417B2

(12) United States Patent
Young

(10) Patent No.: US 7,950,417 B2
(45) Date of Patent: *May 31, 2011

(54) HIGH FLOW NOZZLE SYSTEM FOR FLOW CONTROL IN BLADDER SURGE TANKS

(75) Inventor: Winston B. Young, San Dimas, CA (US)

(73) Assignee: Young Engineering & Manufacturing Inc., San Dimas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/755,322

(22) Filed: Apr. 6, 2010

(65) Prior Publication Data
US 2010/0263758 A1  Oct. 21, 2010

Related U.S. Application Data

(63) Continuation of application No. 12/348,062, filed on Jan. 2, 2002, now Pat. No. 7,690,399, which is a continuation of application No. 11/554,517, filed on Oct. 30, 2006, now Pat. No. 7,472,720.

(51) Int. Cl.
*F16L 55/04* (2006.01)
(52) U.S. Cl. .............................. 138/30; 138/26; 138/42
(58) Field of Classification Search .............. 138/30, 138/26; 210/166, 460, 463; 4/286, 292; 222/145.5, 145.6; 239/597, 598, 599, 601
See application file for complete search history.

(56) References Cited

U.S. PATENT DOCUMENTS

| 605,813 | A | * | 6/1898 | Chase | 4/292 |
| 738,726 | A | * | 9/1903 | Lytle | 4/292 |
| 801,220 | A | * | 10/1905 | Cooper | 4/263 |
| 1,036,181 | A | * | 8/1912 | Brucelarie et al. | 4/286 |
| 1,903,366 | A | * | 4/1933 | Mercier et al. | 4/292 |
| 2,073,899 | A | * | 3/1937 | Luther | 4/288 |
| 2,390,320 | A | * | 12/1945 | Overbeke | 138/30 |
| 2,448,118 | A | * | 8/1948 | Pellettere | 138/30 |

(Continued)

FOREIGN PATENT DOCUMENTS

DE 02111488 * 3/1971

(Continued)

OTHER PUBLICATIONS

Office Action issued in priority U.S. Appl. No. 11/554,517, now U.S. Patent No. 7,472,720, dated Dec. 28, 2007, total 9 pages.

(Continued)

*Primary Examiner* — Patrick F Brinson
(74) *Attorney, Agent, or Firm* — Connolly Bove Lodge & Hutz LLP

(57) ABSTRACT

A surge tank is sized to retain a volume of fluid. A fluid inlet/outlet port is attached to the tank, and an elastomeric bladder is disposed within the tank and separates the fluid from a volume of gas. A nozzle system is disposed within the tank and has a nozzle member comprising a first plurality of axially elongate perforations, and a second plurality of perforations. The nozzle member can extend a partial or complete distance with tank. The tank body includes a throat that extends outwardly from a portion of the tank adjacent the port, and a portion of the nozzle member comprising the first plurality of perforations is disposed within the throat. An annular space exists adjacent the nozzle member in the neck to facilitate the flow of solid constituent within the fluid from the tank and into the nozzle member.

19 Claims, 5 Drawing Sheets

U.S. PATENT DOCUMENTS

| | | | | |
|---|---|---|---|---|
| 2,630,834 | A * | 3/1953 | Weber et al. | 138/30 |
| 2,661,096 | A * | 12/1953 | Tinker | 210/308 |
| 3,003,522 | A * | 10/1961 | Rohacs | 138/30 |
| 3,195,577 | A * | 7/1965 | Greer | 138/30 |
| 3,209,785 | A * | 10/1965 | Mercier | 220/530 |
| 3,333,604 | A * | 8/1967 | Birdwell | 138/30 |
| 3,372,807 | A * | 3/1968 | Barnard | 210/94 |
| 3,406,722 | A * | 10/1968 | Ruth | 138/30 |
| 3,593,747 | A * | 7/1971 | Mercier | 138/30 |
| 3,656,662 | A * | 4/1972 | Peterson | 222/386.5 |
| 3,744,527 | A * | 7/1973 | Mercier | 138/30 |
| 3,834,539 | A * | 9/1974 | Thompson | 210/167.32 |
| 3,935,882 | A * | 2/1976 | Matthews | 138/30 |
| 3,948,288 | A * | 4/1976 | Mayer | 138/30 |
| 3,982,289 | A * | 9/1976 | Robbins | 4/292 |
| 4,103,492 | A * | 8/1978 | Sakazume | 60/588 |
| 4,166,478 | A * | 9/1979 | Sugimura et al. | 138/30 |
| 4,178,965 | A * | 12/1979 | Zahid | 138/30 |
| 4,364,416 | A * | 12/1982 | Jacobellis et al. | 138/30 |
| 4,448,217 | A * | 5/1984 | Mercier | 138/30 |
| 4,519,102 | A * | 5/1985 | Efstratis | 4/292 |
| 4,562,036 | A * | 12/1985 | Shin et al. | 376/283 |
| 4,610,369 | A * | 9/1986 | Mercier | 220/721 |
| 4,638,838 | A * | 1/1987 | Richard et al. | 138/30 |
| 4,872,486 | A * | 10/1989 | Sugimura et al. | 138/30 |
| 5,036,879 | A * | 8/1991 | Ponci | 137/496 |
| 5,388,720 | A * | 2/1995 | Murphy | 220/581 |
| 6,860,296 | B2 * | 3/2005 | Young | 138/30 |
| 7,108,015 | B2 * | 9/2006 | Lombari et al. | 138/30 |

FOREIGN PATENT DOCUMENTS

| | | |
|---|---|---|
| DE | 2 111 488 | 8/1972 |
| DE | 196 24 545 C1 | 8/1997 |
| DE | 19624545 * | 8/1997 |
| EP | 1 271 040 A2 | 1/2003 |
| EP | 1271040 A2 * | 1/2003 |
| NE | 259695 | 4/1964 |
| NE | 0259695 * | 4/1964 |

OTHER PUBLICATIONS

Office Action issued in priority U.S. Appl. No. 12/348,062, dated Mar. 18, 2009, total 9 pages.

Search Report for corresponding European Patent Application No. 07 119 650.5 dated Jan. 9, 2009, total 5 sheets.

* cited by examiner

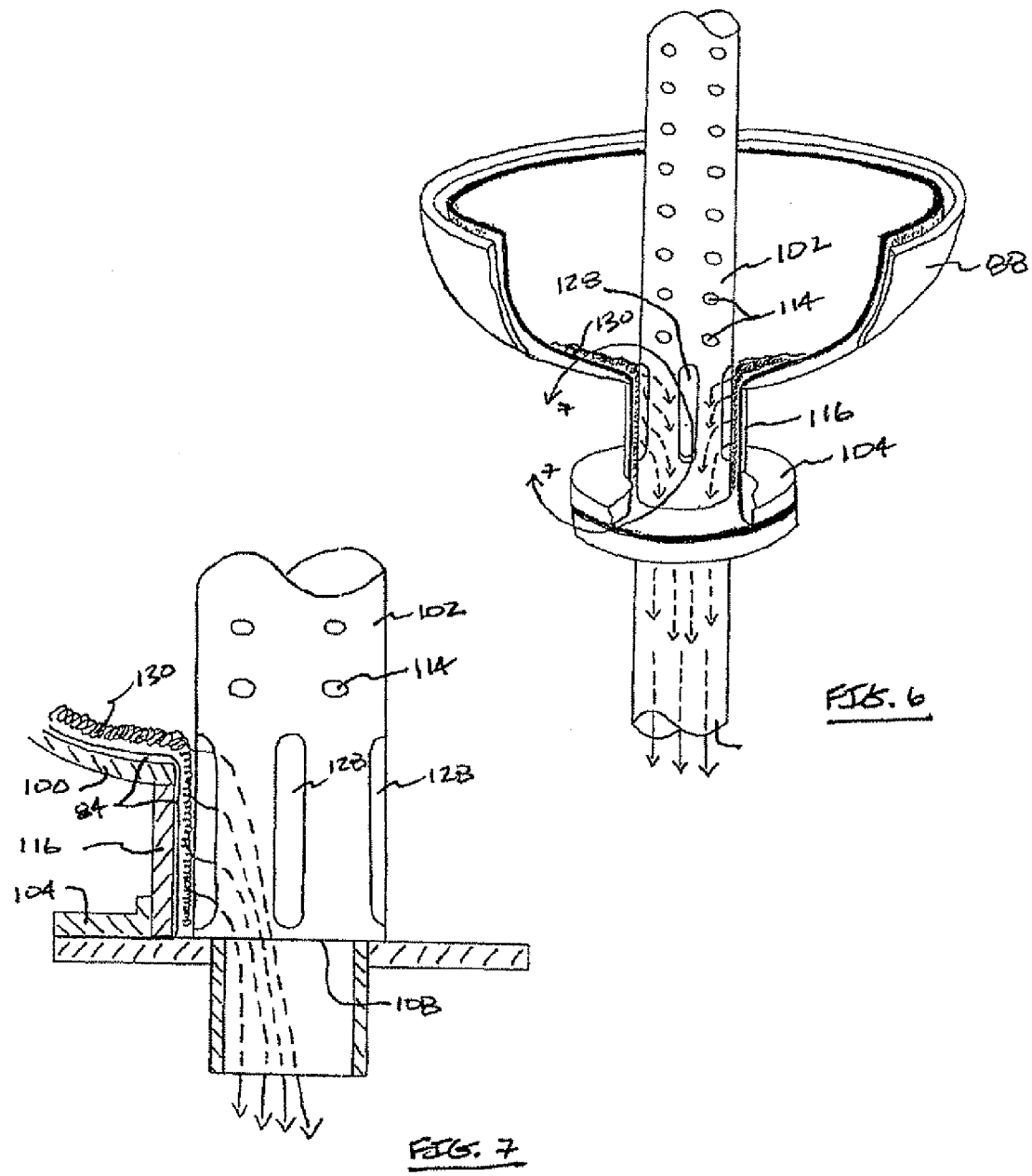

HIGH FLOW NOZZLE SYSTEM FOR FLOW CONTROL IN BLADDER SURGE TANKS

CROSS-REFERENCE TO RELATED APPLICATIONS

This application is a continuation of U.S. patent application Ser. No. 12/348,062, filed Jan. 2, 2009, issued as U.S. Pat. No. 7,690,399, which is a continuation of U.S. patent application Ser. No. 11/554,517, filed Oct. 30, 2006, issued as U.S. Pat. No. 7,472,720, which are specifically incorporated herein by reference in their entirety.

FIELD OF THE INVENTION

The present invention relates to surge tanks, and more specifically, bladder surge tanks having a nozzle system that is specially adapted to facilitate the passage of a fluid system comprising a liquid and solid mixture to uniformly enter and exit the bladder surge tank.

BACKGROUND OF THE INVENTION

Surge tanks are designed to control pressure surges or transients in pipelines, which are created when the flow of the fluid is abruptly changed. Pressure transients can be either positive or negative and are potentially destructive and may result in damage to piping, pumps, instruments, fittings, or other system components.

Surge tanks have been used for years as a means for controlling pressure transients. Some surge tanks employ a bladder design and are well known having applications within various industries, including fire protection systems, municipal water and sewage systems, desalination facilities, fuel systems, and chemical and petrochemical facilities.

During a pump start up, for example, a high transient of pressure is created at the pump discharge. Installation of a bladder surge tank at the pump discharge absorbs the fluid from the pump until the fluid achieves steady state velocity, then the surge tank discharges the fluid into the system to balance the pressure and eliminate the pressure transient. Pressure transients may also be created where there is a sudden and abrupt cessation of liquid flow, hereto, bladder surge tanks can eliminate the pressure transient. Bladder surge tanks also have application as a deluge surge tank where the instantaneous discharge of fluid is required in, for example, fire protection systems.

Regardless of the application, the shape of the bladder during gas precharge or fluid discharge is not totally controllable. In systems where the flow rate exceeds 500 gpm, the bladder may actually seal the tank's fluid inlet/outlet opening during liquid discharge and prevent the tank from emptying its liquid contents. To prevent this, some bladder surge tank manufacturers have placed a wire screen in the tank's inlet/outlet opening. Unfortunately, such a screen actually impedes the liquid flow and is not totally effective in preventing the bladder from blocking the tank's fluid inlet/outlet opening during fluid discharge.

Where there is a sudden flow of fluid into a bladder surge tank, the force of the incoming fluid is concentrated and assumes the shape of the tank's fluid inlet/outlet opening. Such a column of fluid and its associated force is directed towards that portion of the bladder directly above the tank's inlet/outlet opening and can cause damage to the bladder.

There remains a need for a bladder surge tank that eliminates the likelihood of having the bladder block the tank's inlet/outlet opening during fluid discharge and thus interfere with the flow of fluid out of the bladder surge tank. There also remains a need for a bladder surge tank that can redirect the fluid entering the bladder surge tank in a more uniform pattern, thus reducing the possibility of bladder damage from the force of the incoming fluid.

Further, in applications where the system fluid being handled is sewage, e.g., comprising a mixture of liquid and solid components, there is a need to provide a bladder surge tank that can provide the desired degree of surge protection without plugging or fouling, which would impair the ability to provide surge protection, and which would require frequent maintenance to ensure proper operation.

SUMMARY OF THE INVENTION

Surge tanks of this invention are specially engineered to provide a desired degree of surge protection for fluid systems comprising both liquid and solid constituents. In an example embodiment, such surge tanks include a tank body having an interior wall adapted to retain a volume of fluid therein, e.g., a fluid comprising both liquid and solid constituents. The tank body includes a fluid inlet/outlet port adjoined thereto to facilitate the passage of fluid into and out of the tank body. An elastomeric bladder is disposed within the tank body and is adapted to separate a volume of fluid within the tank from a volume of gas within the tank. In an example embodiment, the tank body is charged with a precharge pressure of gas that resides between an inside wall surface of the tank body and an adjacent surface of the bladder.

A nozzle system is disposed within the tank body, and is configured having a nozzle member. The nozzle member comprises a first plurality of perforations that extend a predetermined axial length along the nozzle member. In an example embodiment, the first plurality of perforations extend from an open end of the nozzle member that is positioned adjacent to the fluid inlet/outlet port. The first plurality of perforations have an axially elongate configuration. The nozzle member includes a second plurality of perforations that extends an axial distance from the first plurality of perforations.

Surge tanks of this invention can be oriented horizontally or vertically. The nozzle member can extend within the partial distance, or completely within the tank to an opposite tank interior wall surface. In the event that the nozzle member extends only a partial distance, the end opposite the open end is closed. In the event that the nozzle member extends a complete distance, the end opposite the open end is open and is attached to a flanged member of the tank body. In an example embodiment where the nozzle member extend a complete distance within the tank body, the tank includes a clear-out opening that extends through the tank and that is in communication with an inside diameter of the nozzle member.

The tank body include a throat that extends outwardly from a bottom portion of the tank. At least a portion of the nozzle member comprising the first plurality of perforations is disposed within the throat. The bladder includes a neck that is disposed within the throat and that is interposed between an inside wall surface of the throat and the nozzle member. In an example embodiment, the throat, bladder neck, and nozzle member are sized to provide an annular space between the bladder and the nozzle member that is sufficient to facilitate the flow of solid constituent matter within the fluid from the tank and into the nozzle member. In an example embodiment, the first plurality of perforations are sized to accommodate the passage of the solid constituent matter within the fluid therethrough.

Surge tanks constructed in this manner provide a desired degree of surge protection to fluid systems comprising a mixture of solid and liquid constituents, and do so without unwanted plugging or fouling, thereby avoiding the need for frequent service or maintenance to ensure proper operation.

BRIEF DESCRIPTION OF THE DRAWINGS

These and other features and advantages of the present invention will be better understood by reference to the following detailed description when considered in conjunction with the accompanying drawings wherein:

FIG. 6 is a sectional enlarged schematic view illustrating the high flow nozzle system of FIG. 5; and FIG. 7 is a cross-sectional side view of the high flow nozzle system taken from a section of FIG. 6.

DETAILED DESCRIPTION

In accordance with the present invention, there is provided improved bladder surge tanks comprising high flow nozzle systems suitable for use in various types of fluid and or fluid/solid systems. In particular, bladder surge tanks comprising high flow nozzle systems of this invention are especially well suited for use in fluid systems such as sewage systems that contain fluid and solid components.

Figure 1:
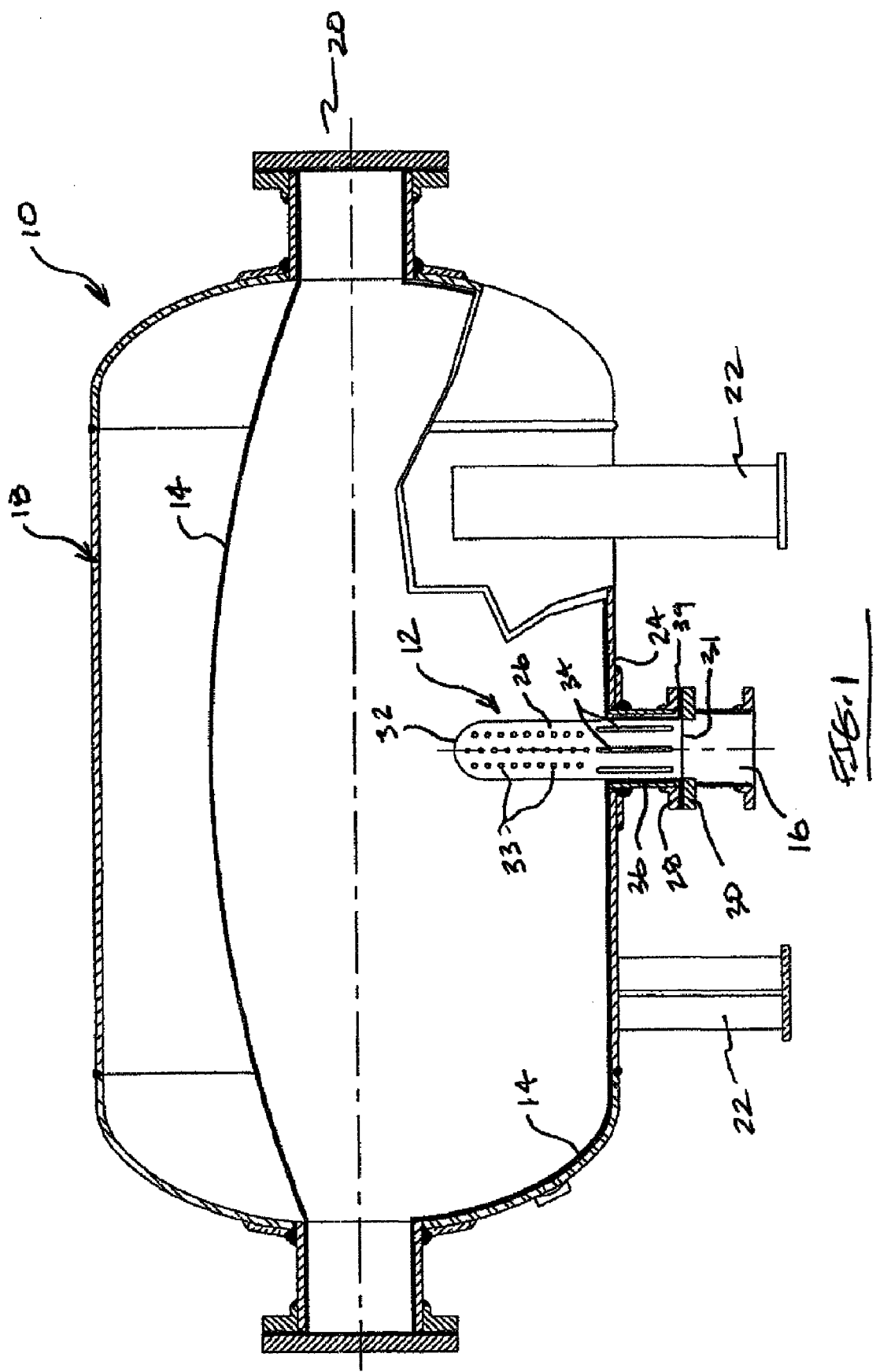
FIG. 1 is a cross-sectional side elevation of a first embodiment horizontal surge tank comprising a high flow nozzle system of this invention.

FIG. 1 illustrates a first embodiment horizontal bladder surge tank 10 comprising a high flow nozzle system 12 of this invention. The horizontal bladder surge tank 10 is a pressure vessel which contains a bladder 14 disposed therein, a fluid inlet/outlet port 16, and the nozzle system 12 positioned within the tank adjacent the inlet/outlet port 16. The horizontal bladder surge tank 10 comprises a body 18 having a bladder access opening 20 disposed therethrough at one end of the tank 10. Opposite the bladder access opening 20, the body can include a gas charging valve, a rupture disc, and a pressure gauge (not shown) Other components of the surge tank may be added or deleted depending upon the particular end use and related need.

Horizontal surge tanks can vary in size from about 250 gallons to more than 5,000 gallons or more. Surge tanks used with high flow nozzle systems of this invention may be constructed from a variety of materials, so long as the material has sufficient strength to support the load and operating pressures and is chemically resistant to the fluid being pumped. In the preferred embodiment, the material of construction is epoxy-coated carbon steel or stainless steel.

The horizontal bladder surge tank 10 is shown supported two or more saddles 22. The bladder surge tank 10 may also be fitted with lift tabs if desired, which can allow the tank to be suspended and placed at the desired location with ease.

The bladder 14 is located within and positioned adjacent at least a partial portion of an interior wall of the surge tank body 18. The bladder 14 may be constructed from a variety of materials that are suitable to contain gas under pressure as well as being resistant to attack from the fluid or liquid and/or solid contents within the system. The bladder 14 must also be strong enough to withstand the pressure or force exerted upon it by the incoming fluid. In the preferred embodiment, the bladder 14 is made of a synthetic nitrile rubber, such as buna-n.

The fluid inlet/outlet opening 16 is located along a bottom portion 24 of the tank body 18, and allows fluid to enter and exit the tank 10. The dimensions of the fluid inlet/outlet opening can vary depending upon the end use application and system needs.

The high flow nozzle system 12 of this invention includes a nozzle member 26 that extends vertically a distance within the tank from a flanged terminal 28 that projects downwardly a distance from the bottom portion 24 of the tank body 18. The flanged terminal 28 is configured to facilitate attachment with a flanged portion 30 of the fluid inlet/outlet port 16 by conventional attachment means, e.g., by bolted connection or the like.

In this example embodiment, the nozzle member 26 includes a body having a generally cylindrical cross section, is column shaped, that is open at one axial member end 31 positioned adjacent that fluid inlet/outlet port 16, and that is closed at an opposite axial member end 32 positioned distant the fluid inlet/outlet port 16. As illustrated in FIG. 1, in this particular embodiment, the nozzle member is sized to project a desired partial distance vertically into the tank 10.

In an example embodiment, the length of the nozzle member is sized such as to provide a desired inlet and outlet flow characteristic within the tank 10. Additionally, it is generally desired that the nozzle member be sized such that it does not interfere with the desired operation or movement of the bladder 14 within the tank 10. In a preferred embodiment, the nozzle member 26 extends vertically within the tank a distance that is less than about ½ of the tank diameter.

Figure 2:
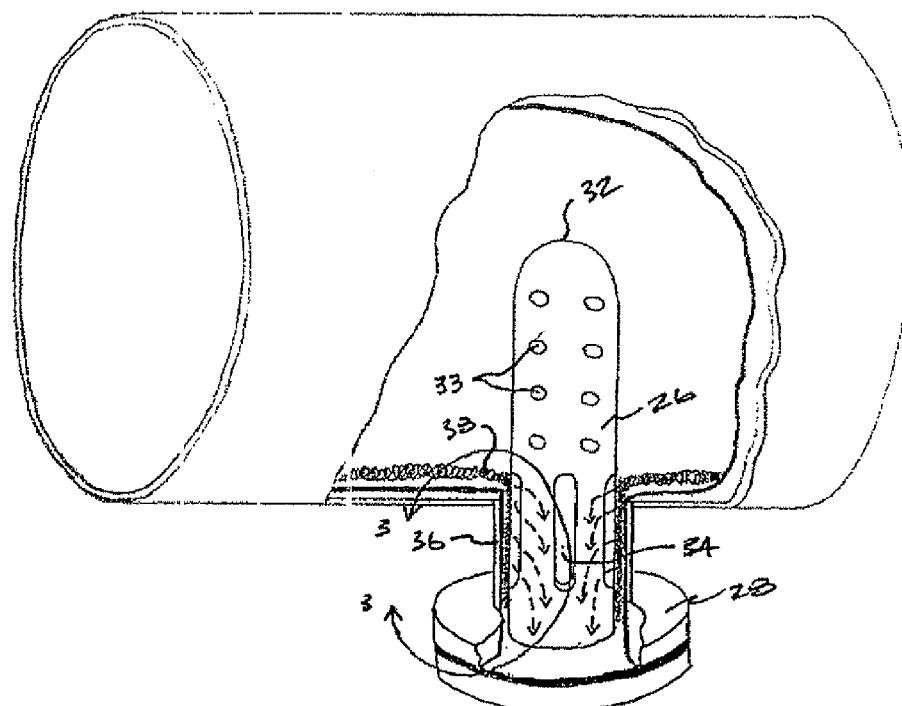
FIG. 2 is a sectional enlarged schematic view illustrating the high flow nozzle system of FIG. 1.

As illustrated in FIGS. 1 and 2, in an example embodiment, the nozzle member 26 closed end 32 is rounded so that it does not otherwise snag or tear the bladder should the bladder come into contact with the nozzle member during operation. The nozzle member 26 also includes a plurality of perforations or openings 33 disposed through the body. The openings 33 are positioned around the circumference of the nozzle member 26 at predetermined locations, and extend axially therealong a desired axial length of the nozzle member. In a preferred embodiment, the openings are positioned lengthwise along the portion of the nozzle member extending vertically from the tank bottom portion 24.

The perforations 33 are positioned along the wall surface of the nozzle member 26 to disperse the incoming liquid uniformly over a wide area so as to minimize any damage to the bladder that could occur were the force of the incoming liquid focused upon one area of the bladder. The total area of the perforations 33 preferably exceeds the total area of the tank's fluid inlet/outlet port 16. The size, number and location of perforations 33 are determined by a series of mathematical calculations better described below. The size of the perforations 33 will also vary depending upon the operating pressure of the system.

Figure 3:
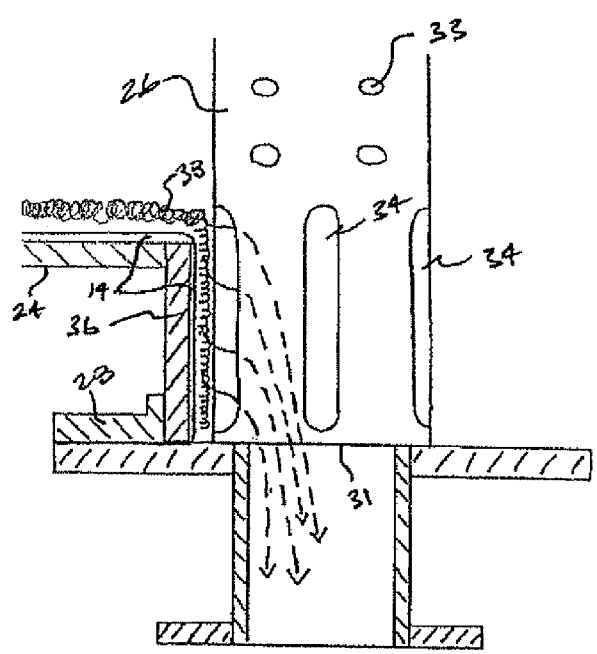
FIG. 3 is a cross-sectional side view of the high flow nozzle system taken from a section of FIG. 2.

Referring to FIGS. 1 to 3, the nozzle member 26 also includes one or more elongate openings or perforations 34 that are positioned vertically below the plurality of perforations 33. In an example embodiment, the elongate perforations 34 are oriented along the nozzle member in a manner that extends axially along a length of the nozzle member 26. The elongate openings 34 are disposed through a portion of the nozzle member that is positioned within a cylindrical throat 36 of the tank that extends downwardly from the tank bottom portion 24. The cylindrical throat 36 is sized and configured to accommodate placement of a desired section of the nozzle member 26 therein. The cylindrical throat includes an open end that is positioned adjacent the nozzle member open end 31, and that is connected to the flanged terminal 28.

In an example embodiment, the cylindrical throat 36 has an inside diameter that is greater than that of the nozzle member outside diameter, and that is sized to provide a desired tolerance between a wall section of the bladder 14 that is positioned adjacent the cylindrical throat sidewall surface and the nozzle member. Ideally, the tolerance is sufficient to facilitate the flow and drainage of fluid and any solid matter 38 disposed within the tank, e.g., when the tank is placed into a sewage system application, from the tank and through the nozzle member via the elongate perforations 34 (as indicated by the arrows in FIGS. 2 and 3). In an example embodiment, it is desired that a tolerance in the range of from about 5 cm to 15 cm be provided for use in a sewage system application. In a sewage system application, it is desired that the tolerance be such as to permit the passage of solids having a size of about 2.54 cm to pass thereby.

Additionally, it is desired that the cylindrical throat 36 be sized axially to accommodate therein a majority of the nozzle member length containing the elongate slotted perforations 34. Functionally, this is desired to facilitate the free flow and drainage of any solid matter contained within the fluid from the body. In an example embodiment, it may be desired that at least about 50 percent, and preferably greater than about 75 percent, of the slotted elongate opening length be disposed within the cylindrical throat.

The number of the slotted elongate openings disposed through the nozzle member, the axial length of the slotted elongate openings, and the width of the slotted elongate openings are understand to vary depending on the particular end use application. In an example embodiment, where the surge tank is placed in a sewage system application, it is desired that the number, length and width of the slotted elongations be sufficient to facilitate the passage the solid matter entrained with the sewage fluid through the nozzle member 26 without plugging and/or otherwise causing an unwanted pressure drop through he nozzle member.

In an example embodiment, the nozzle member slotted elongate openings 34 are positioned circumferentially therearound and equidistant from one another. In such example, the nozzle member may comprise in the range of from about 2 to 20 slotted elongate openings, and the slotted elongate openings can have an axial length in the range of from about 5 to 10 cm, and each have a width that is in the range of from about 3 to 5 cm. It is to be understood that the above provided dimensions are representative of a single example embodiment, and that other embodiments within the scope of this invention may have slotted elongate opening dimensions that are different from those representative dimensions provided above.

As noted above, the bladder 14 is disposed within the tank 18. The bladder, as used in this horizontal embodiment illustrated in FIGS. 1 to 3, includes a cylindrical neck that is positioned within the cylindrical throat 36 with its wall surface adjacent a wall surface of the cylindrical throat 36. In an example embodiment, the bladder neck is reinforced to ensure that it does not collapse towards the slotted elongate openings during operation. The bladder neck includes a flared end 39 (as best shown in FIG. 1) that is interposed between the flanges 28 and 30, and thereby operates to both fix the bladder into place within the throat, and operates to seal the bladder within the tank.

Configured in this manner, the flared end 39 of the bladder neck operates to retain the collar in place within the tank cylindrical throat 36 so that the bladder does not collapse or move inwardly toward the nozzle member when the pressure within the bladder causes the fluid, e.g., liquid and/or solid matter, to flow from the tank and through the nozzle member. This ensures that such desired fluid flow is not obstructed by the bladder, and that the bladder is not extruded through the elongate openings in the nozzle member.

Figure 4:
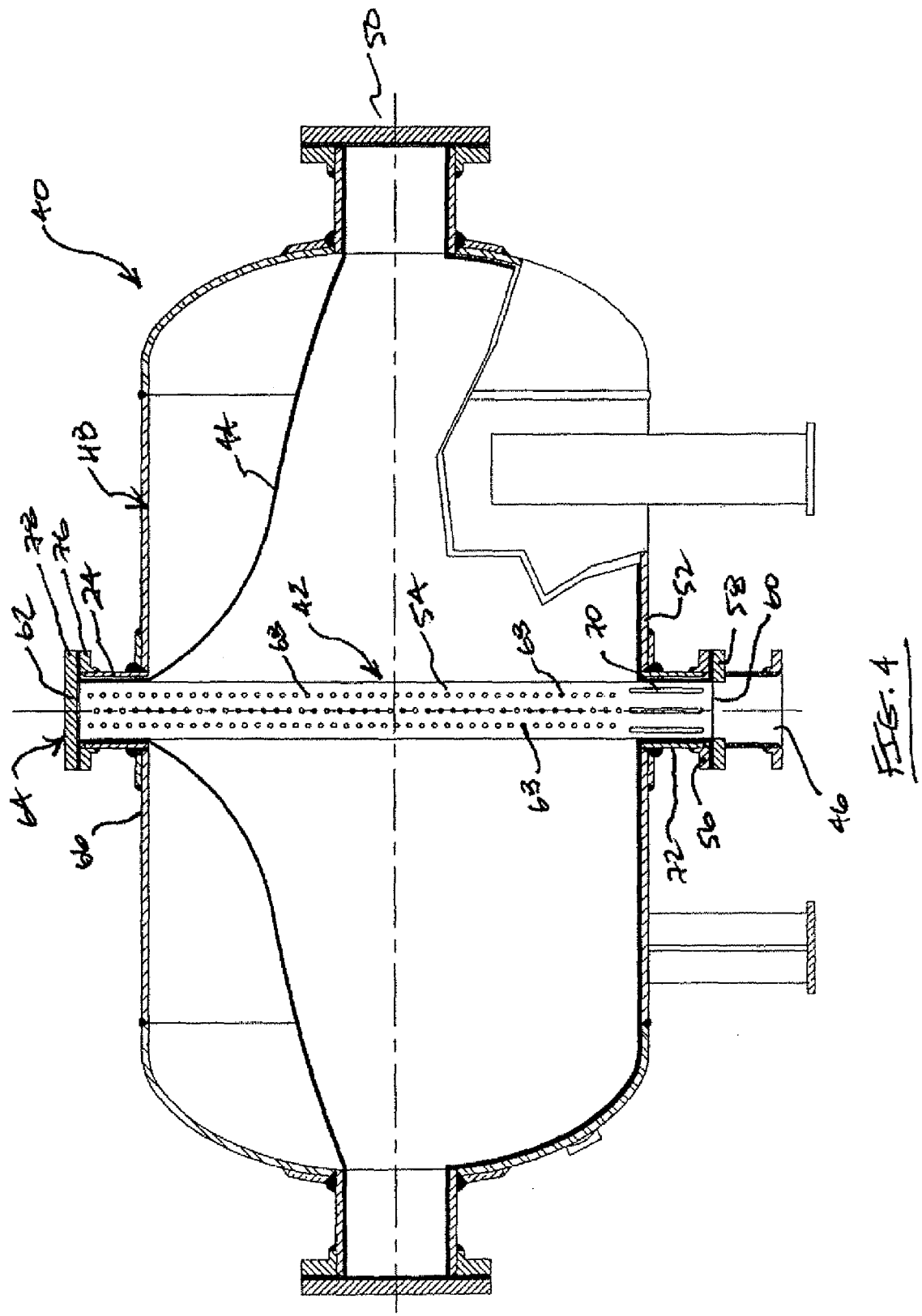
FIG. 4 is a cross-sectional side elevation of a second embodiment horizontal surge tank comprising a high flow nozzle system of this invention.

FIG. 4 illustrates a second embodiment horizontal surge tank 40 comprising a high flow nozzle system 42 of this invention. The horizontal bladder surge tank 40 is a pressure vessel that contains a bladder 44 disposed therein, a fluid inlet/outlet port 46, and the nozzle system 42 positioned within the tank adjacent the inlet/outlet port 46. The horizontal bladder surge tank 40 comprises a body 48 having a bladder access opening 50 disposed therethrough at one or more ends of the tank 40. The body 48 can include a gas charging valve, a rupture disc, and a pressure gauge (not shown) Other components of the surge tank may be added or deleted depending upon the particular end use and related need.

Like the first embodiment horizontal surge tank illustrated in FIG. 1, the fluid inlet/outlet opening 46 is located along a bottom portion 52 of the tank body 48, and allows fluid to enter and exit the tank 40. The dimensions of the fluid inlet/outlet opening 46 can vary depending upon the end use application and system needs.

The high flow nozzle system 42 of this invention embodiment includes a nozzle member 54 that extends vertically a distance within the tank from a flanged terminal 56, that projects downwardly a distance from the bottom portion 52 of the tank body 48. The flanged terminal 56 is configured to facilitate attachment with a flanged portion 58 of the fluid inlet/outlet port 46 by conventional attachment means, e.g., by bolted connection or the like.

In this second embodiment, the nozzle member 54 includes a body having a generally cylindrical cross section, is column shaped, that is open at one axial member end 60 positioned adjacent the fluid inlet/outlet port 46, and that has an opposite axial 62 that is positioned adjacent a clear-out opening 64 that extends a distance away from a top portion 66 of the tank body 48. As illustrated in FIG. 4, unlike the first embodiment nozzle member that extended only a partial vertical distance within the tank, in this second embodiment the nozzle member 54 is sized to project a complete vertical distance within the tank from the tank bottom portion 52 to the tank top portion 66.

The nozzle member 54 includes a plurality of perforations or openings 68 disposed through the body. The openings 68 are positioned around the circumference of the nozzle member 54 at predetermined locations, and extend axially therealong a desired axial length of the nozzle member. In a preferred embodiment, the openings 68 are positioned lengthwise along the portion of the nozzle member extending vertically from the tank bottom portion 52 to the tank upper portion 66.

The perforations 68 are positioned along the wall surface of the nozzle member 54 to disperse the incoming liquid uniformly over a wide area so as to minimize any damage to the bladder that could occur were the force of the incoming liquid focused upon one area of the bladder. The total area of the perforations 68 preferably exceeds the total area of the tank's fluid inlet/outlet port 46. The size, number and location of perforations 68 are determined by a series of mathematical calculations better described below. The size of the perforations 68 will also vary depending upon the operating pressure of the system.

Like the first embodiment disclosed above and illustrated in FIGS. 1 to 3, the second embodiment nozzle member 54 also includes one or more elongate openings or perforations 70 that are positioned vertically below the plurality of perforations 68, that are provided in the same manner and for the purpose as disclosed above for the first embodiment. The elongate openings 70 are disposed through a portion of the nozzle member positioned within a cylindrical throat 72 of the tank that extends downwardly from the tank bottom 52, and that is sized and configured to accommodate placement of a desired section of the nozzle member 54 therein. The cylindrical throat includes an open end that is positioned adjacent the nozzle member open end 60, and that is connected to the flanged terminal 56.

In such second invention embodiment, the cylindrical throat and nozzle member are sized and configured as disclosed above for the first embodiment, to provide a desired tolerance therebetween to facilitate a desired flow and drainage of fluid and any solid matter disposed within the tank, e.g., when the tank is placed into a sewage system application, from the tank and through the nozzle member via the elongate perforations 70. The number of the slotted elongate openings disposed through the nozzle member, the axial length of the slotted elongate openings, and the width of the slotted elongate openings are understand to vary depending on the particular end use application.

The bladder 44 includes a cylindrical neck that is disposed within the tank cylindrical throat 72 in the same manner as described above for the first invention embodiment. The bladder neck includes a flared end interposed between the flanges 56 and 58 to secure the bladder into place and seal the bladder within the tank.

In this second invention embodiment, the nozzle member 54 extends vertically the entire diameter of the tank, thereby providing a larger flow area within the tank and providing a second connection point within the tank. The nozzle member end 62 is disposed within a cylindrical throat 74 that extends from the tank upper portion 66 to the clear-out opening 64. The bladder 44 includes a neck that is disposed within the cylindrical throat, and further includes a flared end that is interposed between flanged ends 76 and 78 of the cylindrical throat and a blind flange connected thereto.

The clear-out opening 64 is provided to enable a user to open the tank, by removing the blind flange 78, and cleaning or clearing out the nozzle member 54, e.g., by water flush or the like. In practice, should the bladder tank become clogged or otherwise restricted during use, the ability to water flush the nozzle member 54 via such clear-out opening provides an easy and efficient way of restoring the desired operation of the tank.

Bladders used in conjunction with the horizontal and/or vertical surge tanks of this invention are preferably precharged with a desired pressure of air or gas. In a preferred embodiment, the bladders and the surge tanks are configured such that the gas precharge exists between a portion of the surge tank inside wall surface and an outside surface of the bladder. The exact precharge pressure that is used in the surge tanks of this invention can and will vary on a number of different factors as well as the intended end use application.

Figure 5:
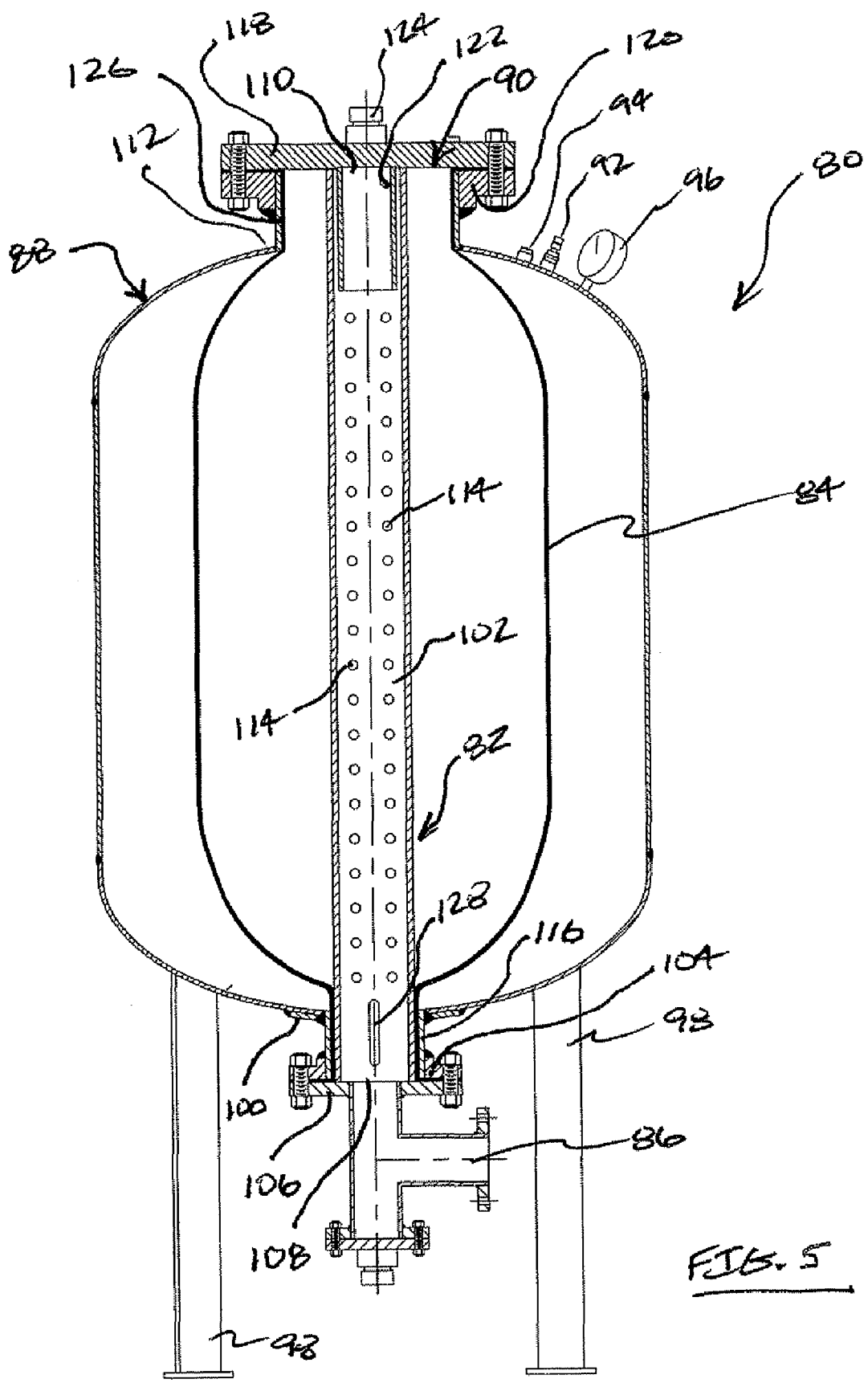
FIG. 5 is a cross-sectional side elevation of a vertical surge tank comprising a high flow nozzle system of this invention.

FIG. 5 illustrates a vertical bladder surge tank 80 comprising a high flow nozzle system 82 of this invention. The vertical bladder surge tank 80 is a pressure vessel which contains a bladder 84 disposed therein, a fluid inlet/outlet port 86, and the nozzle system 82 positioned within the tank adjacent the inlet/outlet port 86. The vertical bladder surge tank 80 comprises a body 88 having a bladder access opening 90 disposed therethrough at one end of the tank 80. The body includes a gas charging valve 92, a rupture disc 94, and a pressure gauge 96. Other components of the surge tank may be added or deleted depending upon the particular end use and related need. In an example embodiment and as noted above, the tank is configured so that a desired precharge pressure is imposed between the bladder and the inside wall of the tank, such that the bladder operates to isolate the fluid being handled within the tank so that it is not placed into contact with the pressurized gas.

In the vertical surge tank of FIG. 5, gas is introduced into the tank's interior cavity by way of the gas charging valve 92. In a surge event, the bladder 84 is filled with the surge liquid, and typically the bladder 44 is filled to between about 80% to 85% capacity. In a preferred embodiment, the gas is nitrogen.

Vertical surge tanks can vary in size from about 250 gallons to more than 5,000 gallons or more. Surge tanks used with high flow nozzle systems of this invention may be constructed from a variety of materials, so long as the material has sufficient strength to support the load and operating pressures and is chemically resistant to the fluid being pumped. In the preferred embodiment, the material of construction is epoxy-coated carbon steel or stainless steel.

The vertical bladder surge tank 80 is shown supported by legs 98, only two of which are shown. The bladder surge tank 80 may also be fitted with lift tabs if desired, which can allow the tank to be suspended and placed at the desired location with ease.

The bladder 84 is located within a surrounding interior wall of the surge tank body 88, and can be constructed from the same types of materials noted above for the horizontal surge tank embodiments. The fluid inlet/outlet opening 86 is located along a bottom portion 100 of the tank body 88, and allows fluid to enter and exit the tank 80. The dimensions and orientation of the fluid inlet/outlet 86 opening can vary depending upon the end use application and system needs. For example, in the example embodiment illustrated in FIG. 5, the fluid inlet/outlet 86 is configured having a right angle opening oriented to direct the flow of fluids entering or exiting the tank in perpendicular to the nozzle system 82. This orientation can and will vary depending on the particular end use application.

The nozzle system 82 includes a nozzle member 102 that extends vertically a distance within the tank from a flanged terminal 104 that projects downwardly a distance from the bottom portion 100 of the tank body 88. The flanged terminal 104 is configured to facilitate attachment with a flanged portion 106 of the fluid inlet/outlet port 86 by conventional attachment means, e.g., by bolted connection or the like.

In this example embodiment, the nozzle member 102 includes a body having a generally cylindrical cross section, is column shaped, that is open at one axial member end 108 positioned adjacent the fluid inlet/outlet port 86. The nozzle member 102 includes an opposite axial end 110 that is also open and that is positioned adjacent the bladder access opening 90. In this example embodiment, the nozzle member 102 is sized having a axial length that extends within the vertical length of the tank, e.g., from the bottom portion 100 to a tank upper portion 112. The nozzle member is sized vertically and diametrically to provide a desired inlet and outlet flow characteristic within the tank 80.

The nozzle member 102 includes a plurality of perforations or openings 114 disposed through the body. The openings 114 are positioned around the circumference of the nozzle member 102 at predetermined locations, and extend axially therealong a desired axial length of the nozzle member. In a preferred embodiment, the openings are positioned lengthwise along a major length of the nozzle member extending vertically from the tank bottom portion 100.

The perforations 114 are positioned along the wall surface of the nozzle member 102 to disperse the incoming liquid uniformly over a wide area so as to minimize any damage to the bladder that could occur were the force of the incoming liquid focused upon one area of the bladder. The total area of the perforations 114 preferably exceeds the total area of the tank's fluid inlet/outlet port 86. The size, number and location of perforations 114 are determined by a series of mathematical calculations better described below. The size of the perforations 114 will also vary depending upon the operating pressure of the system.

In this example embodiment, the nozzle member 102 is connected with the tank at both the tank top and tank bottom. The nozzle member 102 is connected with the tank along the tank bottom portion 100 in the same manner disclosed above for the horizontal tank embodiments; namely, the portion of the nozzle member adjacent open end 108 is concentrically positioned within a cylindrical throat 116 of the tank.

The bladder 84 includes a neck that is positioned adjacent a wall surface of the cylindrical throat, wherein the neck includes a flared end that is interposed between the flanges 104 and 106 to secure the bladder into place. In a preferred embodiment, the neck is reinforced as noted above to prevent the bladder from collapsing against the nozzle member 102 during operation, thereby to avoid plugging the nozzle member and/or being extruded into the nozzle member.

The nozzle member 102 is connected with the tank along the tank top portion 112 by placement of the nozzle member end 110 centered against a flanged member 118, wherein the flanged member 118 is attached to a flanged end 120 of the tank by conventional method such as by bolted attachment. The flanged member 118 includes a clear-out port 122 that is disposed axially therethrough and that is positioned to be in fluid flow communication with an inside diameter of the nozzle member 102. In an example embodiment, the clear-out port 122 projects outwardly and away from the flanged member 118, and inwardly a desired length into the inside diameter of the nozzle member.

The flanged member 118 includes an access element 124 that is removably attached to the clear-out port 122, and that is easily accessible from a position outside of the tank. In an example embodiment, the access element 124 is connected by threaded communication with the flanged member 118, and has an outside surface that is configured to facilitate removal by use of a conventional tool, e.g., a wrench, socket or the like. Once the access element 124 is removed, a suitable clearing device can be connected thereto by use of a complementary coupling.

The clearing device can be one that is designed to clear out the inside diameter of the nozzle member by mechanical, hydraulic, and/or pneumatic means. In an example embodiment, the clearing device is a fluid handling member configured to subject the inside diameter of the nozzle member to a pressurized water stream.

The bladder 84 comprises a neck that is configured for attached along the tank top portion 112. In an example embodiment, the tank top portion 112 includes a cylindrical throat 126 that extends a desired length outwardly therefrom. The bladder neck is positioned adjacent an inside wall surface of the cylindrical throat 126 and includes a flared end that is interposed between the flanged end 120 and the flanged member 118 to hold the bladder securely in place and to prevent unwanted leakage.

Referring to FIGS. 5 to 7, the nozzle member 102 also includes one or more elongate openings or perforations 128 that are positioned vertically below the plurality of perforations 114. In an example embodiment, the elongate perforations 128 are oriented along the nozzle member in a manner that extends axially along a desired length of the nozzle member 102. The elongate openings 128 are disposed through a portion of the nozzle member that is positioned within the cylindrical throat 116 of the tank that extends downwardly from the tank bottom portion 100. As noted above, the cylindrical throat 116 is sized and configured to accommodate placement of a desired section of the nozzle member 102 therein. The cylindrical throat 116 includes an open end that is positioned adjacent the nozzle member open end 108, and that is connected to the flanged terminal 104.

In an example embodiment, the cylindrical throat 116 has an inside diameter sized greater than that of the nozzle member outside diameter to provide a desired tolerance between a wall section of the bladder 84 that is positioned adjacent the cylindrical throat sidewall surface and the nozzle member. As noted above for the horizontal tank embodiment, the tolerance is sufficient to facilitate the flow and drainage of fluid and any solid matter 130 disposed within the tank, e.g., when the tank is placed into a sewage system application, from the tank and through the nozzle member via the elongate perforations 128 (as indicated by the arrows in FIGS. 6 and 7).

In an example embodiment, it is desired that a tolerance in the range of from about 5 cm to 15 cm be provided for use in a sewage system application. In a sewage system application, it is desired that the tolerance be such as to permit the passage of solids having a size of about 2.54 cm to pass thereby.

The cylindrical throat 116 is preferably sized axially to accommodate therein a majority of the nozzle member length containing the slotted elongate perforations 114. Functionally, this is desired to facilitate the free flow and drainage of any solid matter contained within the fluid from the body. In an example embodiment, it may be desired that at least about 50 percent, and preferably greater than about 75 percent, of the slotted elongate opening length be disposed within the cylindrical throat 116.

As with the horizontal tank embodiment disclosed above, the number of slotted elongate openings disposed through the nozzle member, the axial length of the slotted elongate openings, and the width of the slotted elongate openings for use in the vertical tank embodiment are understand to vary depending on the particular end use application. In an example embodiment, where the surge tank is placed in a sewage system application, it is desired that the number, length and width of the slotted elongations be sufficient to facilitate the passage of the solid matter entrained with the sewage fluid through the nozzle member 102 without plugging and/or otherwise causing an unwanted pressure drop through the nozzle member.

In an example embodiment, the nozzle member slotted elongate openings 128 are positioned circumferentially therearound and equidistant from one another. In such example, the nozzle member may comprise in the range of from about 2 to 20 slotted elongate openings, and the slotted elongate openings can have an axial length in the range of from about 5 to 10 cm, and each have a width that is in the range of from about 3 to 5 cm. It is to be understood that the above provided dimensions are representative of a single example embodiment, and that other embodiments within the scope of this invention may have slotted elongate opening dimensions that are different from those representative dimensions provided above.

For both the horizontal and vertical surge tank embodiments, a series of equations is used in calculating the number and placement of each perforation in the nozzle system nozzle member. In an example embodiment, the following mathematical equations are used to calculate the number and placement of perforations for use within a 500 gallon vertical surge tank having an 8-inch diameter fluid inlet/outlet opening at an operating pressure of 250 psi.

Surge Tank Nozzle System Mathematical Formulas

Three sections of holes

Nine rows in each section

Sixteen holes in each row

Number of holes in nozzle member=3 sections×9 rows×16 holes=432 holes

Approximate hole diameter=0.50 in.

Surface area of holes in nozzle member=$432 \times (\pi/4)(0.50)^2 = 84.8$ in.$^2$ Inlet/outlet nozzle system area (8 in. Sch 40 pipe) ID=7.981 in.;$(\pi/4)(7.981)^2 = 50.0$ in.$^2$ The total surface area of the perforations in nozzle system nozzle member for this particular example is approximately 84.8 square inches; and the total surface area of the tank's fluid inlet/outlet port is approximately 50 square inches.

The above-described embodiments of the present invention are merely descriptive of its principles and are not to be considered limiting. The scope of the present invention instead shall be determined from the scope of the following claims including their equivalents.

What is claimed is:

1. A surge tank for accommodating a fluid of liquid and solid constituents, the surge tank comprising:
    a body having an internal chamber and including an outwardly extending section;
    an elastomeric bladder positioned within the body;
    a nozzle disposed in the body and comprising perforations extending therethrough, wherein the perforations have an elongate shape, and wherein a portion of the perforations is disposed within the outwardly extending section.

2. The surge tank as recited in claim 1 wherein the nozzle projects vertically within the tank and includes a closed end opposite an open end.

3. The surge tank as recited in claim 1 wherein the nozzle projects from the outwardly extending section to an opposite wall of the tank and is connected thereto.

4. The surge tank as recited in claim 1 comprising a further plurality of perforations that are positioned adjacent the elongate perforations.

5. The surge tank as recited in claim 1 wherein the bladder includes a neck that is disposed within the outwardly projecting section and that is interposed between an inside wall surface of the outwardly projecting section and the nozzle.

6. A method for accommodating a fluid comprising liquid and solid components, the method comprising the steps of:
    receiving inlet fluid within an internal chamber of a tank, the fluid passing through a nozzle disposed within the tank, the nozzle comprising elongate perforations; and
    directing the fluid to a pressurized bladder disposed within the tank.

7. The method as recited in claim 6 further comprising the step of transporting the fluid within the internal chamber therefrom through the nozzle.

8. The method as recited in claim 6 wherein the nozzle further comprises further perforations that are disposed adjacent the elongate perforations.

9. The method as recited in claim 6 wherein at least some portion of the elongate perforations are positioned within a throat that extends outwardly from the tank.

10. The method as recited in claim 9 wherein a major portion of the elongate perforations are disposed within the throat.

11. The method as recited in claim 6 wherein the nozzle extends and is connected to opposite tank walls.

12. A method for dispersing a fluid comprising a liquid component and a solid component into a tank comprising the steps of:
    directing the fluid into a tank comprising a bladder that operates to separate a fluid volume from a volume of pressurized gas;
    passing the fluid to a nozzle disposed within the tank, the nozzle comprising elongate perforations disposed therethrough; and
    dispersing the fluid entering the nozzle through the elongate perforations.

13. The method as recited in claim 1 wherein a section of the elongate perforations are disposed within a section of the tank that extends outwardly from an internal chamber.

14. The method as recited in claim 1 wherein the nozzle includes a circular perforations that are positioned adjacent the elongate perforations.

15. The method as recited in claim 1 wherein the nozzle includes a closed end.

16. The method as recited in claim 15 wherein the nozzle extends completely within the tank.

17. The method as recited in claim 15 wherein the nozzle extends only partially within the tank.

18. A horizontal tank comprising:
    a body to accommodate a volume of fluid therein, the fluid comprising both liquid and solid constituents;
    means for facilitating flow of fluid into and out of the body;
    a bladder disposed within the body; and
    a nozzle disposed within the body and comprising elongate openings disposed therethrough to facilitate passage of the solid constituents therethrough.

19. A vertical bladder tank comprising:
    a body to accommodate a volume of fluid comprising liquid and solid constituents therein;
    means for facilitating flow of fluid into and out of the body;
    a bladder disposed within the body; and
    a nozzle disposed within the body and comprising elongate openings disposed therethrough to facilitate passage of the solid constituents therethrough.

* * * * *